US012271850B1

(12) United States Patent
Krause (10) Patent No.: US 12,271,850 B1
(45) Date of Patent: Apr. 8, 2025

(54) PROJECT SAFETY SYSTEM (71) Applicant: Richard A. Krause, Arlington Heights, IL (US)

(72) Inventor: Richard A. Krause, Arlington Heights, IL (US)

( * ) Notice: Subject to any disclaimer, the term of this patent is extended or adjusted under 35 U.S.C. 154(b) by 541 days.

(21) Appl. No.: 17/590,487

(22) Filed: Feb. 1, 2022

Related U.S. Application Data

(63) Continuation-in-part of application No. 17/534,023, filed on Nov. 23, 2021, and a continuation-in-part of application No. 17/533,992, filed on Nov. 23, 2021, and a continuation-in-part of application No. 17/517,191, filed on Nov. 2, 2021, and a continuation-in-part of application No. 17/508,277, filed on Oct. 22, 2021, now Pat. No. 12,118,631, and a continuation-in-part of application No. 17/492,246, filed on Oct. 1, 2021, and a continuation-in-part of application No. 17/133,714, filed on Dec. 24, 2020, now Pat. No. 11,321,791.

(60) Provisional application No. 63/144,139, filed on Feb. 1, 2021.

(51) Int. Cl.
*G06Q 10/0635* (2023.01)
*G06Q 10/10* (2023.01)
*G06Q 50/08* (2012.01)

(52) U.S. Cl.
CPC ....... *G06Q 10/0635* (2013.01); *G06Q 10/103* (2013.01); *G06Q 50/08* (2013.01)

(58) Field of Classification Search
CPC ............. G06Q 10/0635; G06Q 10/103; G06Q 50/08; G06Q 10/087
USPC ....................................... 705/28, 5
See application file for complete search history.

(56) References Cited

U.S. PATENT DOCUMENTS

2006/0015475 A1\* 1/2006 Birkner .................. G06Q 50/08

\* cited by examiner

*Primary Examiner* — Ariel J Yu
*Assistant Examiner* — Denisse Y Ortiz Roman
(74) *Attorney, Agent, or Firm* — Christopher J. Scott (57) ABSTRACT

A project safety system receives data from electronic design and/or the project schedule providers, then reads and deciphers it in a way to correlate what specific safety measures and procedures should take place for any given design project. The system distributes alerts/notices to all individuals on the design project to take suggested actions and precautions. Also, the system provides a comprehensive, detailed, and interactive project safety plan that can be adjusted, used for contractual requirements, tracked, and updated. Because of the system's ability to evaluate the actual physical progress along with the status of subsequent successor delivery and assembly activities, the system distributes the most relevant procedures and precautions that all involved on site can specifically relate to their respective activities in real time.

20 Claims, 2 Drawing Sheets

AUTOBUILD SAFETY

FIG. 1 - AUTOBUILD SAFETY

FIG. 2

PROJECT SAFETY SYSTEM

PRIOR HISTORY

This application claims the benefit of U.S. Provisional Patent Application No. 63/144,139 filed in the United States Patent and Trademark Office (USPTO) on 1 Feb. 2021; is a Continuation-in-Part application of pending U.S. patent application Ser. No. 17/133,714 filed in the USPTO on 24 Dec. 2020; is a Continuation-in-Part application of pending U.S. patent application Ser. No. 17/492,246 filed in the USPTO on 1 Oct. 2021; is a Continuation-in-Part application of pending U.S. patent application Ser. No. 17/508,277 filed in the USPTO on 22 Oct. 2021; is a Continuation-in-Part application of pending U.S. patent application Ser. No. 17/517,191 filed in the USPTO on 2 Nov. 2021; is a Continuation-in-Part application of pending U.S. patent application Ser. No. 17/533,992 filed in the USPTO on 23 Nov. 2021; and is a Continuation-in-Part application of pending U.S. patent application Ser. No. 17/534,023 filed in the USPTO on 23 Nov. 2021, the specifications and drawings of which applications are hereby incorporated by reference thereto.

FIELD OF THE INVENTION

These specifications generally relate to a system for managing a construction project, and more particularly to a system that automates the delivery of information in a way to ensure a project is being built safely and that, while human beings are part of the physical construction, they are kept safe from injury or fatality.

BRIEF DESCRIPTION OF THE PRIOR ART

US Patent Application Publication No. 2020/0151937, authored by Miller (937 publication), discloses a Method and System for Construction Project Management Using Photo Imaging Measurements. The '937 publication describes harnesses the use of photo imaging and measurement capture for use by do-it-yourselfers, handymen and small contractors. The method and system operates on mobile computing devices and includes an image recognition system. By performing various imaging-based measurements and then processing the resultant data, the method and system produces bills of materials. invoices, and receipts for the necessary tools and materials required by the construction project.

US Patent Application Publication No. 2020/0027043, authored by Agassi, et al. ('043 publication), discloses a Construction Project Management System and Method Thereof. The '043 publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project.

US Patent Application Publication No. 2019/0003153, authored by Shike, et al. ('153 publication), discloses a Construction Management System, Construction Management Method, and Management Device. The '153 publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 publication), discloses a Method for Integrated Management Including Building Construction and Maintenance Based on Video. The '843 publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 publication), discloses a Cloud-Based System for Collaborating Engineering, Operations, Maintenance, Project Management, Procurement, and Vendor Data and Activities. The '102 publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/032225, authored by Schwartz ('225 publication), discloses a System for On-Site Tracking, Managing, Planning and Staging Construction Projects. The '225 publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 publication), discloses a Construction Management System and Method. The '156 publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 publication), discloses certain Construction Project Management Systems and Methods. The '250 publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 publication), describes a Construction Management System and Method for Linking Data to a Building Information Model. The '037 publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,831,944 ('944 patent), issued to Giattina, discloses a System and Method to Facilitate the Design, Manufacturing and Construction of Structures. The '944 patent describes a system that facilitates the building of a structure according to a project architectural design plan. The system provides standardized information to participants associated with a project based on the project design plan. The project architectural design plan can be compliant with one or more standards stored by the system. The project design plan can also incorporate information regarding products that are utilized in the project such as a plurality of prefabricated building modules. The requirements for a product are dictated by the standards established for the product and the project. Information about products used in the project can be embedded in links of the project architectural design plan.

U.S. Pat. No. 10,593,104 ('104 patent), issued to Robert, et al., discloses certain Systems and Methods for Generating Time Discreet 3D Scenes. The '104 patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component data into a standardized format for use by a plurality of interconnected system-supportive, software-based module components to advance the initial design component data from design concept to final build all within a system of full or near-full automation. What follows is a summary of a non-transitory, computer-implementable software-based application or component supportive of a comprehensive construction project management system otherwise described more fully in U.S. patent application Ser. No. 17/133,714 ('714 application), from which this application claims a benefit and builds thereupon.

System Background and Summary

In the world's pursuit to automate construction there is a perceived need to develop a more comprehensive and interactive way to communicate, in an impactful way, alerts and procedures to help keep a project safe and so that everyone involved on site can develop the project unharmed. The prior art perceives a need for a project safety system that can initially take information provided from the electronic design and/or the project schedule information then read and decipher it in a way to correlate what specific safety measures and procedures should take place. The AUTOBUILD SAFETY system and method according to the present invention begins in such a manner.

The working parts of the AUTOBUILD SAFETY system, in concert with related elements within these specifications together cooperate with one another to generally vet and correct a project design to ensure its competency down to the most minor details. This is necessary in the modern world simply to avoid the number of errors and delays that take place on a construction site. Vetting and/or correcting project designs is a critical aspect of the AUTOBUILD SAFETY system to provide precise and accurate information and direction to enable computers, robots, drones, etc. (i.e., non-human participants) to carry out a project design in an automated manner.

The AUTOBUILD SAFETY system vets at least the following: design intent; compatibility of materials and their connections to other materials; material strengths; structural integrity; moisture contents; colors; precise locations in the intended three-dimensional envelope, etc. The AUTOBUILD SAFETY system very basically ensures the project design and information provided in support thereof are competent, compatible, and comprehensive toward the intended project design in order to accomplish the main goal of this art, which is building/assembling/constructing the project design in an automated manner. This is the main objective of this art: to properly build in an automation manner. These steps are required to accomplish it.

The system according to the present invention then distributes alerts/notices to all individuals on the project to take suggested actions and precautions. Also, in a short amount of time (e.g. days or hours) in an artificially intelligent, automated manner, this system then provides a comprehensive, detailed, and interactive project safety plan that can be adjusted, used for contractual requirements, tracked, and updated in an automated manner whether the project is built with human labor or by robot, drone, or other automation methods. Because of the system's ability to evaluate the actual physical progress along with the status of subsequent successor delivery and assembly activities, the AUTOBUILD SAFETY system and method according to the present invention distributes the most relevant procedures and precautions that all involved on site can specifically relate to their respective activities on any given day.

The AUTOBUILD SAFETY system and method according to the present invention is preferably integrated with the industry's best safety practices along with national safety standards such as OSHA standards. This AUTOBUILD SAFETY system also greatly benefits insurance companies by keeping them informed of status and that safety measures are being delivered, confirmed, and acted on daily, by the insured individuals on the project. Additionally, the system is used by off-site managers and construction companies to document that individuals on site have followed industry-standard safety practices and procedures. The AUTOBUILD SAFETY system and method according to the present invention meets these key objectives.

The keys to the system that are unique to the industry are: 1. How the system is delivered to the individuals on a construction site; 2. The way the system creates the most impactful instructions to follow; 3. That, in an automated fashion, the system delivers specific safety measures required for the work at hand on any given day the work is taking place; 4. The system creates a record with a daily confirmation system, confirming safety instructions are received and followed; and 5. The system provides initial steps of medical care and procedures as the needs therefor may arise.

AUTOBUILD Safety System

Initially, the AUTOBUILD Safety System compiles project design data information and/or the project schedule information as input therein. The system utilizes its built-in intelligence and internal catalog to understand each construction assembly activity and what is needed to carry out each activity most safely. It then assembles a safety management matrix for the project. It takes the inputted information stated above, then separates and categorizes all stages of the project. Additionally, it notes special conditions exemplified by large pieces of equipment and assembly systems, to complex, out of the ordinary materials, certain sequences, logistics, personnel positions at assembly site(s), etc.

The system utilizes historic data, basic logic, learned adjustments from recorded accidents and incidences, industry safety standards, OSHA requirements, etc. to support the intelligence of the system. Using this intelligence, the AUTOBUILD SAFETY system assembles the initial Project Safety Plan for the project. This initial Project Safety Plan consists of an overall safety narrative to follow and even more importantly schedules a comprehensive list of precautions and actions to follow that are attached to each activity of the project being constructed. This comprehensive listing of precautions and actions, attached to each activity, is compiled with the intent of being distributed daily as to specifically remind individuals on the project site to follow precautions and actions relating to those activities of the day. The initial Project safety plan can then be evaluated, if desired, by any safety professional or project manager or superintendent to accommodate for any special considerations.

As the project proceeds the AUTOBUILD SAFETY SYSTEM tracks the actual project progress utilizing feedback via check off systems confirming precautions and procedures have been read, carried out, and the tasks/activities have been completed. This allows the system to advance and distribute successive precautions and procedures information for the successive sets of activities. During this process documentation is developed that confirms compliance of required standards and practices by each of the individuals involved with the project.

This confirmation of compliance can also be used in connection with safety compliance related contractual commitments made by subcontractors involved with the project. Further, if proper precautions and procedures are not being followed, automatic alerts are sent to the managers, accountable individuals, and entities to take corrective action. As an additional service, the AUTOBUILD SAFETY system provides, initial level, first aid and tentative care instructions, when called upon, to treat an individual that has been injured or affected by any incident, hazard, contaminant, or exposure on the project.

Distribution of all aspects of this system are communicated through networked linkage of the system to cell phone numbers related to individuals on the project, email blasts to individuals and entities involved with the project, and other media that is conducive of best making an impact on the individuals involved with the project. The interactive feedback required in the operation of the system is achieved with those same devices. The reader will note the system according to the present invention is most relevant during the time when human beings are part of the physical construction of a project. However, as physical construction is substituted with automation, such as machinery, robots, drones, etc. this system can be used to communicate to those devices to guide them to keep the project safe, protecting themselves (the devices) from destruction.

BRIEF DESCRIPTIONS OF THE DRAWINGS

Other features and objectives of the present invention will become more evident from a consideration of the following brief description of the patent drawings submitted in support of these specifications.

DETAILED DESCRIPTION OF THE PREFERRED EMBODIMENT

A software program may comprise numerous modules as separate executable files that form parts of a whole program. A module is a software component or part of a program that contains one or more routines. One or more independently developed modules make up a program. An enterprise-level software application may contain several different modules, and each module serves unique and separate business operations. Given the complexity of the overall operating system, the author has selected the term module to describe the software module components that together cooperate to provide or support the Comprehensive Construction Project Management System of parent U.S. patent application Ser. No. 17/133,714 ('714 application) from which this application claims a benefit and is a Continuation-in-Part Application.

Figure 1:
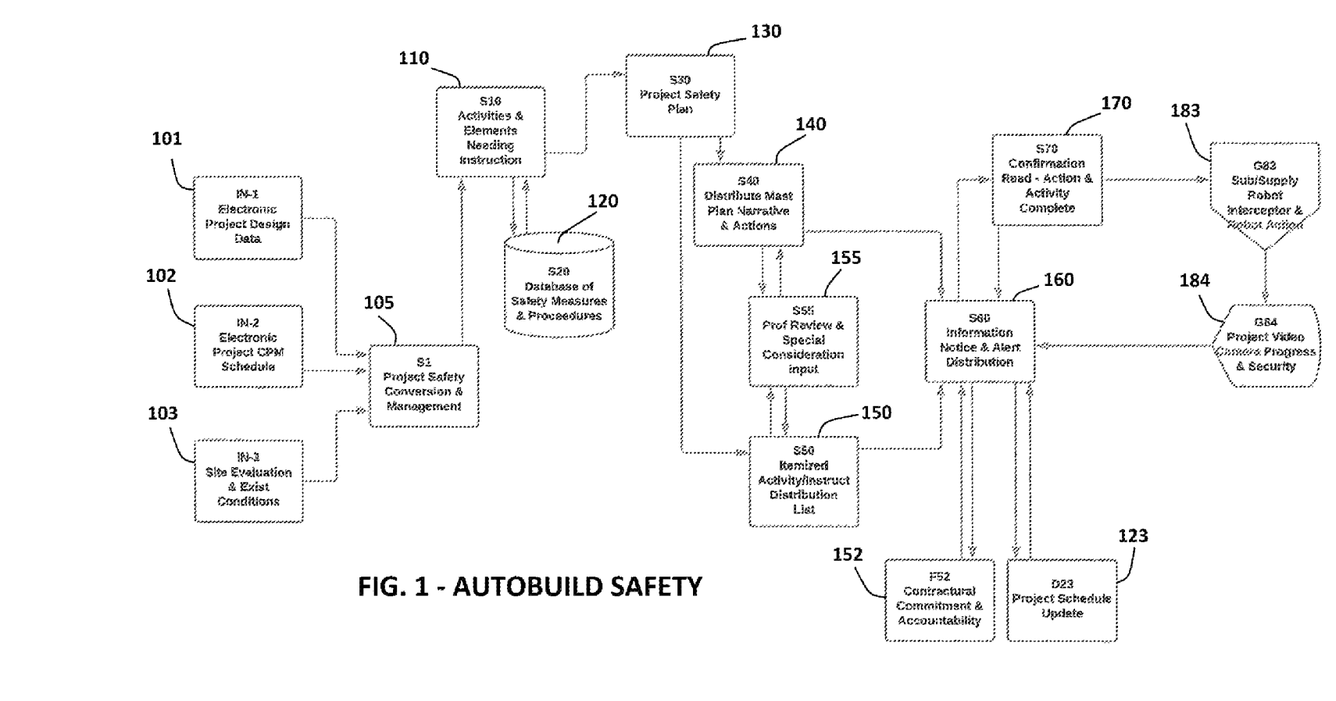
FIG. 1 is a first technical flowchart diagram depicting a centralized or hub-like Project Safety Conversion and Management software module component in downflow communication from a series of Electronic Project Design, Electronic Project CPM Schedule, and Site Evaluation and Exiting Conditions software module components with a series of branching software module components or nodes in downflow communication from the Project Safety Conversion and Management software module component.
Figure 2:
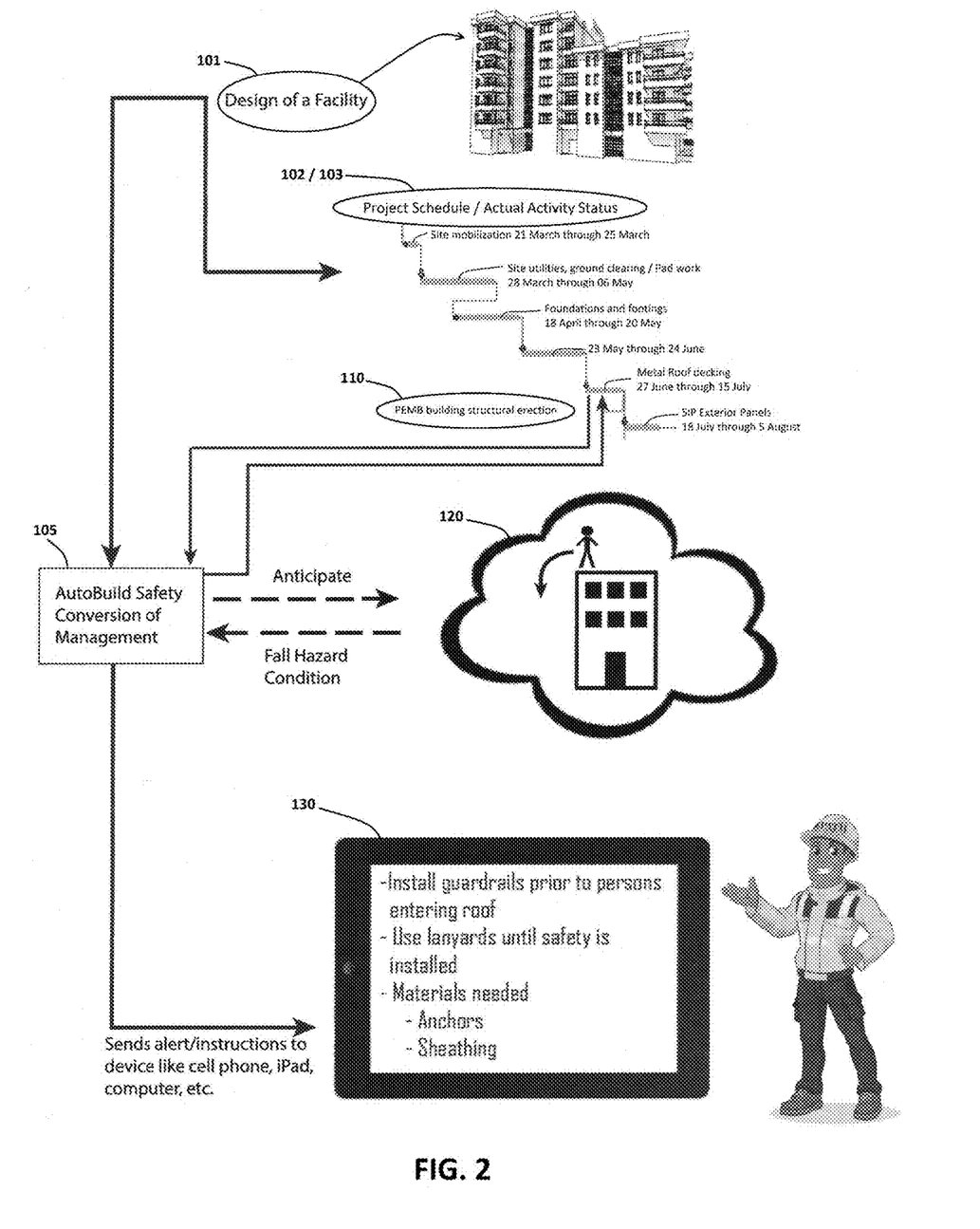
FIG. 2 is a second simplified flowchart diagram depicting a centralized or hub-like Project Safety Conversion and Management software module component in downflow communication from a basic Project Design, Project Schedule, and Actual Activity Status software module components with a series of branching software module components or nodes in downflow communication from the Project Safety Conversion and Management software module component for identifying potential hazards and suggested protocols for enhancing safety of workers on site.

Referring now with more specificity to the drawing submitted in support of these specifications, the S1 Project Safety Conversion & Management Node or software module component (105) accumulates the information inputted into it, individually or collectively, as it relates to project design data node or software module component (101), project CPM schedule data node or software module component (102), and site evaluation and existing conditions data node or software module component (103). The project design data node or software module component (101), project CPM schedule data node or software module component (102), and the site evaluation and existing conditions data node or software module component (103) are state of the art elements separate and apart from the AUTOBUILD SAFETY System upon which the system relies to implement safety measures. The S1 Node or software module component (105), with its intelligence, recognizes and extracts the specific information it needs to carry out its purpose.

For instance, the S1 Node or software module component (105) deciphers information such as fabrication activities, material, equipment, labor, hoisting, machinery, excavations, soil conditions, height concerns, assembly constraints, etc. that is needed to itemize all activities on the project needing or requiring instruction, reminders, and procedures to direct a safe operation and environment for the individuals on the site. While extracting this information the S1 Project Safety Conversion & Management Node or software module component (105) organizes the received information into orderly categories to assist the downstream S10 Activities & Elements Needing (or Requiring) Instruction Node or software module component (110) in performing its role of assigning the proper industry standard safety instructions to each activity.

The S10 Activities & Elements Needing (or Requiring) Instruction Node or software module component (110) receives an orderly arrangement of the projects activities from the S1 Node or software module component (105) and communicates with, and extracts from, the database within the S20 Database of Safety Measures and Procedures Node or software module component (120). In summary, the S10 Node or software module component (110) ensures that each safety-sensitive activity (i.e. an activity requiring or calling for safety measures or protocols) taking place on the project that deserves some level of instruction or alerts of caution are identified and matched with the proper instructions and alerts of caution that exists in the industry today, utilizing all up-to-date knowledge of what is best known in the industry and conforming with any existing regulations that may apply.

The S20 Database of Safety Measures and Procedures Node or software module component (120) is a database that is organized in categories and contains all up-to-date knowledge, industry standards, and local and national regulations concerning safety, safe operations, precautions needed, hazardous materials, equipment operation, hoisting, etc. and countered on a vast array of diverse construction projects. The S20 database Node or software module component (120) is initially loaded with all information that exists in the industry in providing best safety practices including OSHA guidelines, standard safety practices, knowledge learned from incidences, etc. Within this database, there are prewritten instructions, alerts, precautions, and guidelines customized for each type of activity that may take place on a construction site. This information is in a format readily available to be distributed, when called for, and when the system activates the progression of activities taking place on a project. In other words, this is a bank of useful information that is ready to be dispensed at any time appropriate or required to alert the individuals on a project site to best carry out those activities safely.

The S30 Project Safety Plan Node or software module component (130) is where, after receiving all information from the S20 Database of Safety Measures and Procedures Node or software module component (120), the overall or comprehensive safety plan for the design project is developed. This type of plan is typically required, or at least is highly advised, on most significant construction projects. This plan provides an overall narrative on the project and, along with reminders of standard safety practices, highlights the major aspects where special care and higher safety awareness should take place during the project. The safety plan directs instruction to specific guidelines, publications, and regulations. Additionally, the Project Safety Plan lays out a project specific action plan should an emergency event or mishap take place on the project, including procedures and where the nearest emergency care is located. After completing its role, the S30 Node or software module component (130) sends the plan out to two downstream nodes, including the S40 Node or software module component (140) and the S50 Node or software module component (150), to be implemented and distributed at their appropriate times.

The first node receiving the plan from the S30 Node or software module component (130) is the S40 Distribute Master Plan Narrative & Actions Node or software module component (140). The S40 Node or software module component (140) is created to send out the overall master plan at the start of the design project to set, as a framework, the overall awareness and intentions of safety needing to be addressed on the project. It also establishes awareness of the procedures to take place should an emergency incident occur including locations of immediate medical care. The S50 Itemized Activity Instruction Distribution List Node or software module component (150) is meant to be accessed and distributed, specifically for each different activity taking place during different stages of the project.

The S50 Itemized Activity Instruction Distribution List Node or software module component (150) is the place keeper for all the individual itemized activities with corresponding instructions, alerts, and procedures for the project. For example, this is where specific instructions on how to recognize and handle excavations and unsafe or unstable walls of an excavation. Another example would be reminders to check safe electrical outlets, electrical connections, or faulty extension cords. Other examples include hoisting safety and use of crane during that stage of the project where hoisting and use of crane is required; or the use of temporary guardrails on edge of elevated floors, or stair openings, prior to permanent walls being installed. These are simple obvious examples, however there are thousands, and many can be overlooked or forgotten in a short time presenting hazards for the workforce on the project. The AUTOBUILD SAFETY system is meant to keep the highest level of awareness prior to starting any unsafe activities and requires acknowledgment by the individuals that they have been reminded of the instructions alerts and procedures.

The S55 Professional Review & Special Consideration Input Node or software module component (155) gives the option of a safety professional, project manager and/or project superintendent the ability to review these safety plans and make any changes that may be required to consider special conditions of the design project. This node or software module component sends out an alert to the users of the system asking for any possible input prior to the system taking place at the project site.

The S60 Information Notice & Alert Distribution Node or software module component (160) is the management system of the entire project specific safety plan. It utilizes the most updated information in both the S40 Node or software module component (140) and the S50 Node or software module component (150) respectively to distribute, inform, and alert all best safety practices and required regulations in an interactive way by communicating with the individuals on the project site and by measuring the stage and activities for which the project is at, at any given time.

At the start of the project the S60 Node or software module component (160) distributes the master project safety plan it receives from the S40 Node or software module component (140). The S60 Node or software module component (160) then distributes the initial pertinent instructions, alerts, and procedures for the first activities required to start the project. Once this distribution is made, it requires the individuals engaged in the project on site to acknowledge reading the distribution, acknowledge it will take the appropriate safety precautions, and finally, notify back to the S60 Node or software module component (160) the activity is completed. Once these confirmations and acknowledgments are received back to the S60 Node or software module component (160), the S60 Node or software module component (160) then distributes the next distribution or grouping of distributions (as required) to keep the information flow current and ahead of the next activities that are about to begin.

If these confirmations or acknowledgments are not received back at the S60 Node or software module component (160), a red flag alert is sent to the appropriate designations established at the beginning of the project to initiate corrective action to take place. There is an optional feature to utilize, discussed in more detail below, that cooperates with the F52 Contractual Commitment & Accountability Node or software module component (152) that can enhance procedures in which safety conformity is monitored and more directly alerted if not being followed.

The S70 Confirmation Read—Action & Activity Complete Node or software module component (170) is a confirmation/check off response node or software module component. This is where the individuals on site, needing to take safe actions and precautions, receive the information, alerts, and procedures that pertain to the work at hand that day/week. This is done via cell phone, computer, etc. as discussed hereinabove. Once received, each individual is to respond back that it is acknowledged. There is then, another prompt sent to everyone asking to confirm action has been taken. This helps to confirm that safe practices are, at a minimum, on the minds of the workforce and documents acknowledgment that action has been taken. If this prompt is not responded to, a red flag alert is sent to preassigned accountable parties to address. A third and last prompt is simply a check off as to when that construction activity is completed. This last prompt allows the system to track the progress of the project.

The S70 Confirmation Read—Action & Activity Complete Node or software module component (170) works in a circular communicative manner with the S60 Information Notice & Alert Distribution Node or software module component (160) to confirm proper actions and safety practices are progressing through all stages of the project to completion. This cycle also creates a well-documented report as to what has taken place through the project should there be any mishap or incident.

The S70 Confirmation Read—Action & Activity Complete Node or software module component (170) utilizes automated assembly technology as advancements are made. The reader will consider from the flowchart depicted in FIG. 1 an optional connection to the G83 Sub/Supply Robot Interceptor & Robot Action Node or software module component (183) via which the S70 Node or software module component (170) may transfer the same type of interaction it has with human beings to future technology of automated construction such as robots, drones, etc. This connection progresses further to another optional G84 Project Video Camera Progress & Security Node or software module component (184) for surveilling via video/camera confirmation not only project stage progress, but also confirming that instructed safe practices have been taken.

The G83 Node is a Sub/Supply Robot Interceptor & Robot Action Node or software module component (183). This node or software module component is an example of an accessory that can plug into the AUTOBUILD SAFETY system as currently or foreseeably available in the market. The G83 Node or software module component (183) operates within software-based components that may already be carried or implemented by vendors involved with the project, and though current and future developments of Drone and Robotic abilities. The G83 Node or software module component (183) is basically the communication system that informs and directs drones, mechanical equipment, and robots to carry out the work required in the appropriate sequence, in the correct location, and at the correct time. The G83 Node or software module component (183) further has the capability to communicate back to appropriate nodal functions that are needed for collaboration of physical actions so that on-site work advances properly.

The G84 Node or software module component is a live Project Video/Camera Progress and Security surveillance Node or software module component (184). This node or software module component is an example of an accessory that can plug into the AUTOBUILD SAFETY system for enhancement as currently or foreseeably available in the market. The G84 Node or software module component (184) coordinates live video through fixed cameras and drones and other sensors that are tied into GPS systems to track progress visually and materially in real-time at the project site. The G84 Node or software module component (184) provides the eyes, ears, and fingers to the AUTOBUILD SAFETY system that functions similarly to a human operator or superintendent in visualizing, inspecting, confirming, even touching and feeling elements of the project to ensure timely compliance with an ability to communication directly or indirectly with other support nodes or software module components to keep the circular system progressing. The G84 Node or software module component (184) enhances the AUTOBUILD SAFETY system by video/camera confirmations not only project stage progress, but also confirms the instructed safe practices have been taken.

The F52 Node is a Contractual Commitment and Accountability System Node or software module component (152). The F52 Node or software module component (152) is optionally utilized by the AUTOBUILD SAFETY system, at which contract agreements with vendors or individuals involved with the project can be populated. The F52 Node or software module component (152) essentially confirms in written detail the scope of work to be provided along with performance criteria including contractually committed safety performance requirements. At the F52 Node or software module component (152) there is unilateral communication in order to also allow executives of the vendor's organization supplying materials labor or services to the project to be aware of something being amiss concerning the safety performance progress and allow them to take action that may be in addition to what is actually taking place on the project site. In construction contracting it is common practice to have terms of communication that may present nonconformance to the construction contract. This communication between the S60 Node or software module component (160) and the F52 Node or software module component (152) facilitates the legal obligations for notice of noncompliance or default that are typically required by contract.

The D23 Project Schedule Update Node or software module component (123) essentially allows operators of the AUTOBUILD SAFETY system to make Project Schedule Updates that may be needed in changes of construction sequence or to refine where the actual progress stage/status is at. This allows fine tuning, if needed, for the timing in which notices, alerts, and procedures are dispersed. This node or software module component is in two-way or bi-directional communication with the S60 Node or software module component (160) to understand and coordinate the stage at which both nodes are tracking the project. In other words this is a checks and balance feature that confirms proper information is being distributed as it relates to the actual progress at the project site.

While the above descriptions contain much specificity, this specificity should not be construed as limitations on the scope of the invention, but rather as an exemplification of the invention. The foregoing specifications are contemplated to essentially provide a project safety system operable within a construction project management system. The project safety system according to the present invention is contemplated to preferably comprise, in combination, a series of networked computers, a series of computer-implementable, software-based modular components, including a project design, project schedule, and site evaluation and existing conditions software module component; a centralized project safety, conversion and management software module component in downflow communication with the project design, project schedule, and site evaluation and existing conditions software module component; and at least one downstream software module component.

The series of networked computers are preferably in communication with one another and are configured to implement a series of non-transitory, computer-implementable, software-based modular components allowing directional inter-module communication therebetween. The project design, project schedule, and site evaluation and existing conditions software module component is operable to provide information concerning a design project to be added for enabling the project safety system to perform its function in providing project safety information required for the design project.

The centralized project safety, conversion and management software module component is in downflow communication with the project design, project schedule, and site evaluation and existing conditions software module component for accumulating information received from the project design, project schedule, and site evaluation and existing conditions software module component, analyzing the information, labeling the information and organizing the information in a manner for enabling and supporting peripheral software module components in networked, inter-module communication with the project safety, conversion and management software module component to perform peripheral software module component functions.

The at least one downstream software module component receives data from the centralized project safety, conversion and management software module component and is configured to combine information from the project design, project schedule, and site evaluation and existing conditions software module component via the centralized project safety, conversion and management software module component for implementing safety measures and procedures that will be used throughout the design project.

The project design, project schedule, and site evaluation and existing conditions software module component may preferably comprise three separate software module components, including a project design software module component, a project schedule module component, and a site evaluation and existing conditions software module component. The project design software module component, the project schedule module component, and the site evaluation and existing conditions software component together provide the information concerning the design project to be added for enabling the project safety system to perform its function in providing project safety information required for the design project.

The at least one downstream software module component may preferably comprise an activities and elements requiring instruction software module component. The activities and elements requiring instruction software module component receives an orderly arrangement of project activities from the centralized project safety, conversion and management software module component for ensuring each safety-sensitive activity taking place on the design project is identified and matched with the proper instructions and safety alerts. The activities and elements requiring instruction software module component is preferably in bidirectional communication with a database of safety measures and procedures software module component for accessing up-to-date industry information for providing best safety practices.

The project safety plan software module component is preferably in unidirectional downflow communication with the activities and elements requiring instruction software module component for developing a comprehensive safety plan for the design project. A distribute master plan narrative and actions software module component and an itemized activity instruction distribution list software module component are both preferably in unidirectional downflow communication with the project safety plan software module component. The distribute master plan narrative and actions software module component is operable to transmit awareness and intentions of the comprehensive safety plan at the start of the design project, and the itemized activity instruction distribution list software module component itemizes safety protocols for each design project activity.

A professional review and special consideration input software module component is preferably in bidirectional communication with booth the distribute master plan narrative and actions software module component and the itemized activity instruction distribution list software module component. The professional review and special consideration input software module component is operable to enable a safety professional to review the comprehensive safety plan and make any changes that may be required to consider special conditions of the design project.

An information notice and alert distribution software module component is preferably in unidirectional downflow communication with both the distribute master plan narrative and actions software module component and the itemized activity instruction distribution list software module component. The information notice and alert distribution software module component manages the comprehensive safety plan by communicating with individuals on the project site and measuring the stage and activities for the design project at any given time. A confirmation read-action and activity complete software module component is in bidirectional communication with the information notice and alert distribution software module component thereby being operable in a circular communicative manner therewith to confirm proper actions and safety practices are progressing through all stages of the design project to completion.

A sub-supply robot interceptor and robot action software module component is preferably in unidirectional downflow communication with the confirmation read-action and activity complete software module component, which sub-supply robot interceptor and robot action software module component is preferably in unidirectional upflow communication with a project video-camera progress and security surveillance software module component. The project video-camera progress and security surveillance software module component is in unidirectional upflow communication with the information notice and alert distribution software module component thereby forming a cyclic communication within the components. The sub-supply robot interceptor and robot action software module component is operable to govern, inform and/or direct mechanical equipment to perform work as required. The project video-camera progress and security surveillance software module component surveils design project and confirms that safe practices have been taken.

A contractual commitment and accountability system software module component is preferably in bidirectional communication with the information notice and alert distribution software module component for facilitating legal-contractual obligations. A project schedule update software module component is in bidirectional communication with the information notice and alert distribution software module component for enabling design project schedule updates as required.

Accordingly, although the project safety system according to the present invention has been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A project safety system operable within a construction project management system, the project safety system comprising, in combination:
  a plurality of networked computers being in communication with one another and configured to implement a plurality of non-transitory, computer-implementable, software-based components allowing inter-component communication therebetween;
  a project design, project schedule, and site evaluation and existing conditions software component configured to provide information concerning a project design for enabling the project safety system to perform its function in providing project safety information required for a construction of a project from the project design;
  a centralized project safety, conversion and management software component in communication with the project design, project schedule, and site evaluation and existing conditions software module component configured to:
  accumulate information received from the project design, project schedule, and site evaluation and existing conditions software module component;
  analyze said information for errors to properly enable and support downstream automation processes to support a complete construction of the project design in an automated manner;
  alert a user if corrections are required for ensuring said information supports the project design and the complete construction thereof;
  convert said information into a standardized data format that enables peripheral software components in networked, inter-component communication with the project safety, conversion and management software component to perform automated peripheral software component functions;
  label and organize said information in a manner for enabling and supporting peripheral software module components in networked, inter-component communication with the project safety, conversion and management software component to perform peripheral module component functions;
  send said information as labeled and organized to at least one downstream software component configured to:
    receive said information from the centralized project safety, conversion and management software component; and
    combine said information from the project design, project schedule, and site evaluation and existing conditions software component via the centralized project safety, conversion and management software component for implementing safety measures and procedures that will be used throughout the construction of the project design; and assign industry standard safety instructions to each project design activity associated with the project design as assisted by said information as labeled and organized.

2. The project safety system of claim 1 wherein the project design, project schedule, and site evaluation and existing conditions software component comprises a project design software component, a project schedule component, and a site evaluation and existing conditions software component, the project design software component, the project schedule component, and the site evaluation and existing conditions software component together providing the information concerning the project design for enabling the project safety system to perform its function in providing project safety information required for the project design.

3. The project safety system of claim 1 wherein the at least one downstream software component comprises an activities and elements requiring instruction software component, configured to receive an orderly arrangement of project design activities from the centralized project safety, conversion and management software component for ensuring each safety sensitive activity taking place on the project design is identified and matched with the proper instructions and safety alerts.

4. The project safety system of claim 3 wherein the activities and elements requiring instruction software component is in communication with a database of safety measures and procedures software component configured to access up-to-date industry information for providing best safety practices.

5. The project safety system of claim 4 wherein a project safety plan software component is in communication with the activities and elements requiring instruction software component, the project safety plan software component being configured to develop a comprehensive safety plan for the project design.

6. The project safety system of claim 5 wherein a distribute master plan narrative and actions software component and an itemized activity instruction distribution list software component are in communication with the project safety plan software component, the distribute master plan narrative and actions software component being configured to transmit awareness and intentions of the comprehensive safety plan at the start of the project design, the itemized activity instruction distribution list software component being configured to itemize safety protocols for each project design activity.

7. The project safety system of claim 6 wherein a professional review and special consideration input software component is in communication with the distribute master plan narrative and actions software component and the itemized activity instruction distribution list software component, the professional review and special consideration input software component being configured to enable a safety professional to review the comprehensive safety plan and make any changes that may be required to consider special conditions of the project design.

8. The project safety system of claim 7 wherein an information notice and alert distribution software component is in communication with both the distribute master plan narrative and actions software component and the itemized activity instruction distribution list software component, the information notice and alert distribution software component being configured to manage the comprehensive safety plan by communicating with individuals on a project site and measuring a stage and the project design activities for the project design at any given time.

9. The project safety system of claim 8 wherein a confirmation read-action and activity complete software component is in communication with the information notice and alert distribution software component thereby being operable in a circular communicative manner therewith to confirm proper actions and safety practices are progressing through all stages of the project design to completion.

10. The project safety system of claim 9 wherein a sub-supply robot interceptor and robot action software component is in communication with the confirmation read-action and activity complete software component, the sub-supply robot interceptor and robot action software component being in communication with a project video-camera progress and security surveillance software component, the project video-camera progress and security surveillance software component being in communication with the information notice and alert distribution software component, the sub-supply robot interceptor and robot action software component being configured to inform and direct mechanical equipment to perform work as required, the project video-camera progress and security surveillance software component being configured to surveil the project design and confirm that safe practices have been taken.

11. The project safety system of claim 9 wherein a contractual commitment and accountability system software component is in communication with the information notice and alert distribution software component for facilitating legal-contractual obligations.

12. The project safety system of claim 9 wherein a project schedule update software component is in communication with the information notice and alert distribution software component for enabling project design schedule updates as required.

13. A project safety system operable within a computer network environment, the computer network environment being configured to implement a plurality of non-transitory, computer-implementable, software-based components allowing inter-component communication therebetween, the project safety system comprising:
    at least one computer configured to implement the plurality of non-transitory, computer-implementable, software-based components allowing inter-component communication therebetween;
    a project design, project schedule, and site evaluation and existing conditions software component configured to provide information concerning a project design for enabling the project safety system to perform its function in providing project safety information required for a construction of a project from the project design;
    a centralized project safety, conversion and management software component in communication with the project design, project schedule, and site evaluation and existing conditions software component configured to:
    accumulate information received from the project design, project schedule, and site evaluation and existing conditions software component;
    analyze said information for errors to properly enable and support downstream automation processes to support a complete construction of the project design in an automated manner;
    alert a user if corrections are required for ensuring said information supports the project design and the complete construction thereof;
    convert said information into a standardized data format that enables peripheral software components in networked, inter-component communication with the project safety, conversion and management software component to perform automated peripheral software component functions;

label and organize said information in a manner for enabling and supporting peripheral software components in networked, inter-component communication with the project safety, conversion and management software component to perform peripheral software component functions;

send said information as labeled and organized to at least one downstream software component configured to:

receive said information from the centralized project safety, conversion and management software component; and combine said information from the project design, project schedule, and site evaluation and existing conditions software component via the centralized project safety, conversion and management software component for implementing safety measures and procedures that will be used throughout the construction of the project design; and assign industry safety instructions to each project design activity associated with the project design as assisted by said information as labeled and organized.

14. The project safety system of claim 13 wherein the at least one downstream software component comprises an activities and elements requiring instruction software component configured to receive an orderly arrangement of project design activities from the centralized project safety, conversion and management software component for ensuring each safety sensitive activity taking place on the project design is identified and matched with the proper instructions and safety alerts.

15. The project safety system of claim 14 wherein the activities and elements requiring instruction software component is in communication with a database of safety measures and procedures software component configured to access up-to-date industry information for providing best safety practices.

16. The project safety system of claim 15 wherein a project safety plan software component is in communication with the activities and elements requiring instruction software component configured to develop a comprehensive safety plan for the project design.

17. The project safety system of claim 16 wherein a distribute master plan narrative and actions software component and an itemized activity instruction distribution list software component are in communication with the project safety plan software component, the distribute master plan narrative and actions software component being configured to transmit awareness and intentions of the comprehensive safety plan at the start of the project design, the itemized activity instruction distribution list software component being configured to itemize safety protocols for each project design activity.

18. The project safety system of claim 17 wherein a professional review and special consideration input software component is in communication with the distribute master plan narrative and actions software component and the itemized activity instruction distribution list software component, the professional review and special consideration input software component being configured to enable a safety professional to review the comprehensive safety plan and make any changes that may be required to consider special conditions of the project design.

19. The project safety system of claim 18 wherein an information notice and alert distribution software component is in communication with both the distribute master plan narrative and actions software component and the itemized activity instruction distribution list software component, the information notice and alert distribution software component being configured to manage the comprehensive safety plan by communicating with individuals on a project site and measuring a stage and the project design activities for the project design at any given time.

20. The project safety system of claim 19 wherein a confirmation read-action and activity complete software component is in communication with the information notice and alert distribution software component thereby being operable in a circular communicative manner therewith to confirm proper actions and safety practices are progressing through all stages of the project design to completion.

\* \* \* \* \*